(12) United States Patent
Yap et al.

(10) Patent No.: US 6,456,761 B2
(45) Date of Patent: Sep. 24, 2002

(54) APPARATUS, ASSEMBLY, AND METHOD FOR MAKING MICRO-FIXTURED LENSED ASSEMBLY FOR OPTOELECTRONIC DEVICES AND OPTICAL FIBERS

(75) Inventors: Daniel Yap, Thousand Oaks, CA (US); Anson Au, Los Angeles, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 3 days.

(21) Appl. No.: 09/920,666

(22) Filed: Jul. 31, 2001

Related U.S. Application Data

(62) Division of application No. 09/452,942, filed on Dec. 1, 1999.

(51) Int. Cl.[7] .................................................. G02B 6/32
(52) U.S. Cl. ......................................... 385/33; 385/147
(58) Field of Search ............................ 385/88–99, 147

(56) References Cited

U.S. PATENT DOCUMENTS

| | | | |
|---|---|---|---|
| 4,002,410 A | 1/1977 | Frederick et al. | ............. 356/31 |
| 4,332,474 A | 6/1982 | Miller | ......................... 356/366 |
| 5,155,778 A | 10/1992 | Magel et al. | ................. 385/18 |
| 5,420,953 A | 5/1995 | Boudreau et al. | ............ 385/88 |
| 5,500,910 A | 3/1996 | Boudreau et al. | ............ 385/24 |
| 5,587,822 A | 12/1996 | Lee | ............................ 349/124 |
| 5,940,564 A * | 8/1999 | Jewell | ......................... 385/35 |
| 6,174,092 B1 * | 1/2001 | Siala | ............................ 385/88 |
| 6,207,950 B1 * | 3/2001 | Verdiell | ...................... 250/239 |
| 6,227,724 B1 * | 5/2001 | Verdiell | ....................... 385/90 |

OTHER PUBLICATIONS

Armiento Craig A. et al., "Gigabit Transmitter Array Modules on Silicon Waferboard", IEEE Transactions on Components, Hybrids, and Manufacturing Technology, vol. 15, No. 6, Dec. 1992, pp. 1072–1080.

J. M. Cheong et al., "High alignment tolerance coupling scheme for multichannel laser diode/singlemode fibre modules using a tapered waveguide array", Electronics Letters, vol. 30, No. 18, Sep. 1, 1994, pp. 1515–1516.

D. Yap et al., "RF optoelectronic transmitter and receiver arrays on silicon waferboards", SPIE, vol. 2691, Apr. 1996, pp. 110–117.

\* cited by examiner

Primary Examiner—Akm E. Ullah
(74) Attorney, Agent, or Firm—V. D. Duraiswamy; M. W. Sales

(57) ABSTRACT

A method and apparatus for aligning an optical fiber to an optoelectronic element. The optical fiber and optoelectronic element are attached to a base. The base is made from a first crystallographic orientation material, and a lens is made from a second crystallographic orientation material. The lens is aligned to the base using the crystallographic orientations, and the optical fiber and optoelectronic element are aligned to the base/lens assembly.

15 Claims, 6 Drawing Sheets

APPARATUS, ASSEMBLY, AND METHOD FOR MAKING MICRO-FIXTURED LENSED ASSEMBLY FOR OPTOELECTRONIC DEVICES AND OPTICAL FIBERS

This application is a division of application Ser. No. 09/452,942, filed Dec. 1, 1999.

STATEMENT REGARDING FEDERALLY SPONSORED RESEARCH OR DEVELOPMENT

This invention was made with Government support under Contract Number DAAB07-96-3-J016 awarded by the U.S. Army. The Government has certain rights in this invention.

BACKGROUND OF THE INVENTION

1. Field of the Invention

This invention relates in general to electronic assemblies, and, in particular, to a micro-fixtured lensed assembly for optoelectronic devices and optical fibers.

2. Description of Related Art

Optoelectronics and fiber optic communications are commonly used in communications and electronic devices. The use of optical fibers for telephonic and other information transfer is desirable because of the high bandwidth and high data rates possible with fiber optic lines. The electronics that transmit and receive the light signals that travel on fiber optic lines have become integrated with the fiber optic lines for better signal transmission and reception.

Alignment between the individual strands of a fiber optic cable and the detectors and transmitters is crucial to a fiber optic data transmission system. There are typically two approaches to alignment of the fiber to the electronics; active approaches, where light is passed through the fiber and strikes the detector, and the detector is monitored during positioning of the fiber in relation to the detector, and passive approaches, where no light is passed through the fiber, and mechanical devices are used for alignment of the individual parts of the transmitter or receiver assembly.

Previous passive alignment approaches directly couple light between a fiber and an optoelectronic device without passing that light through a separate optical lens. As a result, divergence of the optical beam and differences in the optical-mode sizes can reduce the optical coupling efficiency.

FIG. 1 illustrates an optoelectronic transmitter assembly of the related art. As shown, assembly 100 comprises a silicon platform 102, also called a silicon waferboard, and a laser chip 104. Grooves 106 are etched into the silicon platform 102 for mechanically holding optical fibers against the silicon platform 102 and for aligning the optical fibers to the laser chip 104. The grooves 106 are typically v-shaped. The silicon platform 102 also contains pedestals 108, typically nine microns high, formed by reactive ion etching (RIE) into the top surface of the silicon. The pedestals 108 serve to position the laser chip 104 on the plane of the silicon platform 102.

A notch 110 is etched into laser chip 104, and the notch is placed against one pedestal 108, while the cleaved front facet 112 is placed against two other pedestals 114. Standoffs 116 are constructed from polyimide of a controlled thickness, typically five microns, and patterned by RIE. The standoffs 116 determine the vertical position of the laser chip 104 which is mounted with the laser devices down, facing the silicon platform 102.

FIGS. 2A–2B illustrate another device of the related art. The device 200 of FIGS. 2A–2B illustrate a silicon platform 202 with a photodetector array 204 where the photodetector array 204 is mounted with the photodetectors facing away from the silicon platform 202. Grooves 206 and ribbon support 208 are etched into the silicon platform 202 to mechanically support the fiber optic cables and the individual optical fibers. As described with respect to FIG. 1, the photodetector array 204 is positioned and aligned by pressing the photodetector array 204 against pedestals 210 that have been etched into the surface of silicon platform 202. However, the photodetector size must be larger than necessary to accommodate the alignment tolerances, inaccuracies in dicing and/or cleaving of the photodetector array 204, and divergence of the light beam before it reaches the photodetector array 204, thus limiting the bandwidth of the output.

FIG. 2B illustrates the light path 212 of the device illustrated in FIG. 2A. Grooves 206 are typically v-shaped, and terminate in reflective mirror surfaces 214 that redirect the light from an optical fiber out of the plane of the silicon platform 202 and onto the backside of the photodetector array 204. Wire bonds 216 carry the signals generated by photodetector array 204 to other circuitry.

FIG. 3 illustrates a laser array of the related art. Device 300 again has a silicon platform 302 and laser array chip 304 mounted to silicon platform 302. Laser array chip 304 is an edge emitting laser array, and the optical fibers 306 are guided through a structure 308 in silicon platform 302 to in-plane optical elements 310 formed directly on the silicon platform 302. The tapered waveguides 312 transform the small diameter of the optical mode in the edge-emitting laser 304 to the larger diameter of the optical mode in the optical fiber 306. The tapered waveguides 312 are formed from the thin films of silica deposited on the silicon platform 302 surface. The optical fibers 306 are held in v-grooves etched in the silicon platform 302. Since both the tapered waveguides 312 and the v-grooves are fabricated directly on the silicon platform 302, their relative positions can be controlled precisely. The laser chip is mounted onto the silicon platform 302 by means of solder bumps 314 and standoffs 316, which also align the chip on the silicon platform 302. However, this approach suffers from having the optical elements formed as an integral part of the silicon platform 302, thereby reducing the types of optical elements that can be used in the assembly 300.

There is therefore a need in the art for an apparatus and method for aligning optical fibers to optoelectronic devices. There is also a need in the art for a method of aligning optical fibers to optoelectronic devices that reduces manufacturing time and costs. There is also a need in the art for a method of aligning optical fibers to optoelectronic devices that maximizes the throughput of the optical fiber.

SUMMARY OF THE INVETION

The present invention discloses a method and apparatus for aligning an optical fiber to an optoelectronic element. The apparatus comprises a base and a lens. The base is fabricated from a first crystallographic orientation, and includes an alignment feature for an optical fiber. The lens is fabricated from a second crystallographic orientation, and is aligned with the base using a second alignment feature associated with the first and second crystallographic orientations.

A method in accordance with the present invention comprises the steps of coupling an optoelectronic element to a base comprising a material having a first crystallographic orientation, coupling a lens to the base, the lens comprising a material having a second crystallographic orientation, wherein the lens is aligned to the base using the first crystallographic orientation and the second crystallographic orientation, and attaching an optical fiber to the base, wherein the optical fiber is placed proximate to the lens, such that a light path of the optical fiber is aligned with the optoelectronic element through the lens.

An optoelectronic assembly in accordance with the present invention comprises an optoelectronic element, a lens assembly, and a base. The optoelectronic element converts between an optical signal and an electrical signal. The lens assembly comprises a first material having a first crystallographic orientation and includes a first alignment feature. The base comprises a second material having a second crystallographic orientation and includes a second alignment feature. The lens assembly and base are aligned using the first alignment feature and the second alignment feature, the first alignment feature aligns the lens assembly to the optoelectronic element, and the second alignment feature aligns an optical fiber to the lens assembly.

The present invention provides an apparatus and method for aligning optical fibers to optoelectronic devices. The present invention also provides a method of aligning optical fibers to optoelectronic devices that reduces manufacturing time and costs. Further, the present invention provides a method of aligning optical fibers to optoelectronic devices that maximizes the throughput of the optical fiber.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
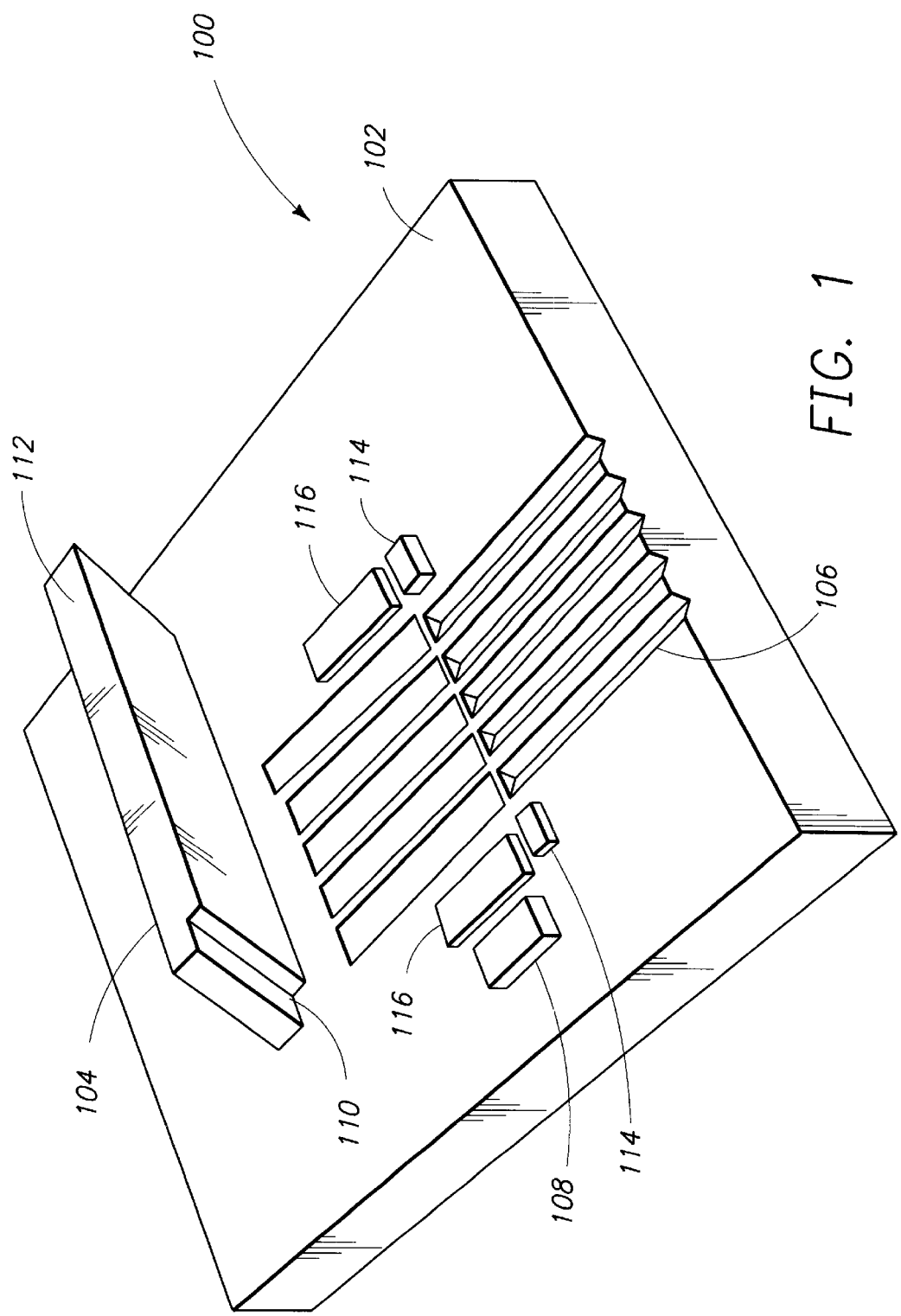
FIG. 1 illustrates an optoelectronic transmitter assembly of the related art.
Figure 2B:
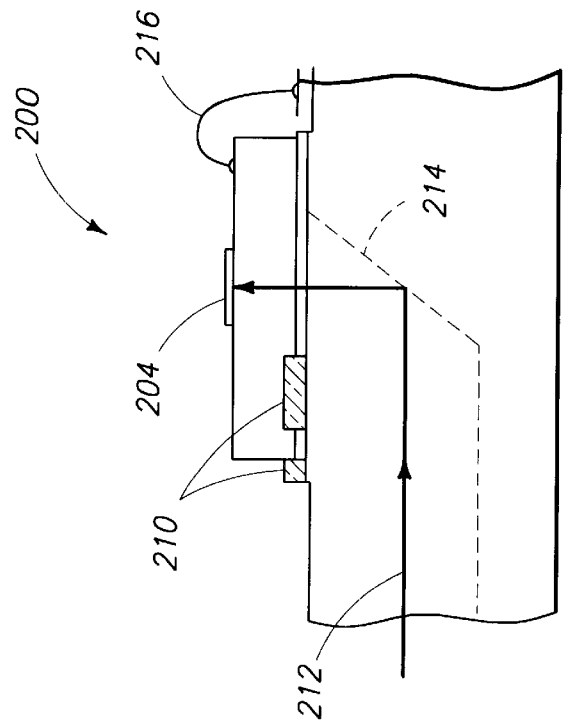
FIGS. 2A-2B illustrate another device of the related art.
Figure 2A:
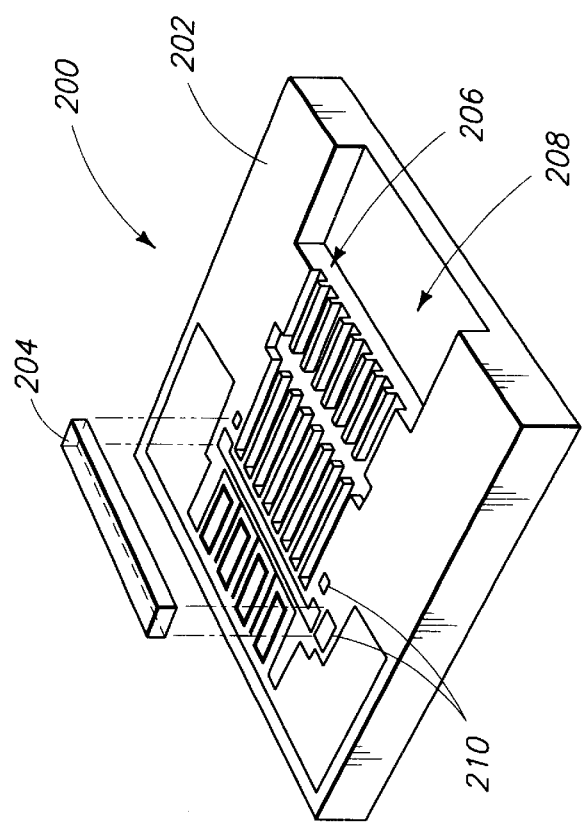
Figure 3:
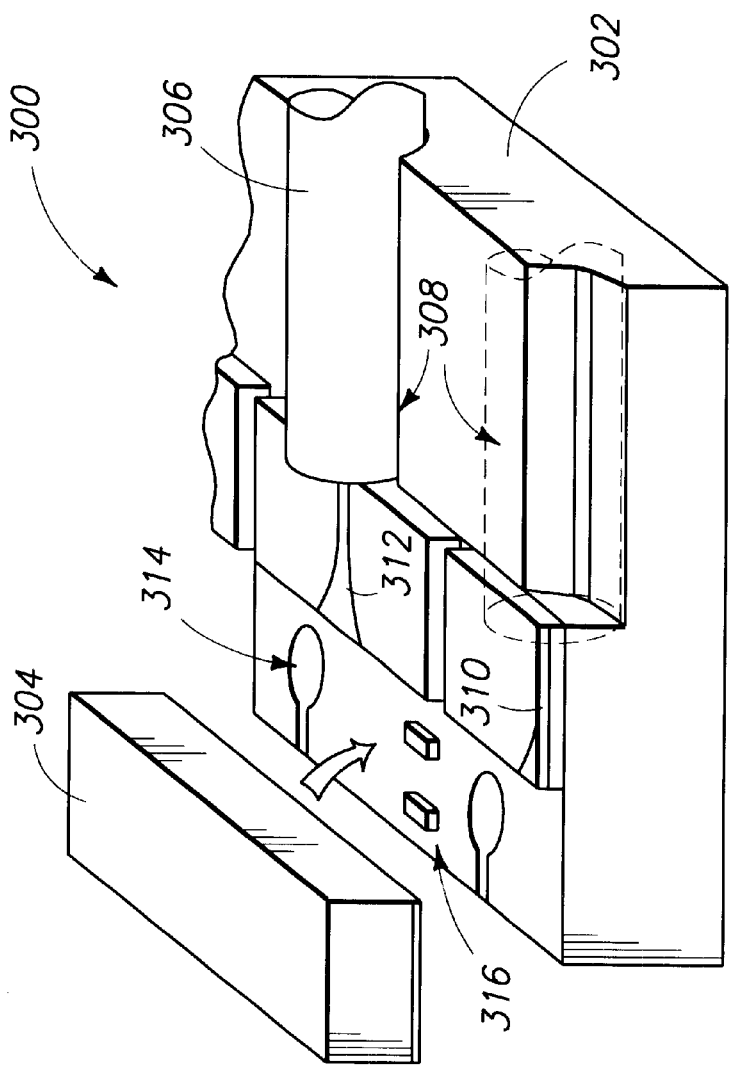
FIG. 3 illustrates a laser array of the related art.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

The present invention comprises a two-part lensed assembly for aligning, fixing, and coupling one or more optoelectronic devices to one or more optical fibers. Both pieces of the assembly are fabricated from silicon. One piece, the base of the assembly, is fabricated from (100) silicon and contains features for positioning the optoelectronic device chip, the optical fibers, and the second piece. The second piece, the lens insert, is fabricated from (110) silicon and contains the lenses as well as features for positioning the lenses and for establishing the input and output focal distances of those lenses. Crystallography-controlled etching of and electroplating onto both pieces are used to form mechanical features which accurately determine the relative positions of the lenses, the optoelectronic devices, and the optical fibers.

The present invention provides a means to align and couple a chip containing one or more optoelectronic devices with one or more optical fibers through one or more optical lenses. In contrast to previous methods, the assembly of this invention performs the alignment of optical fibers, optical lenses, and optoelectronic devices by means of microfixtures, with alignment accuracies of several microns or better. That alignment is done without having to apply electrical connections to the optoelectronic devices or pass light through the fibers, as needed for "active" alignment approaches. The use of "passive" alignment speeds up the labor-intensive alignment process and reduces the manufacturing costs.

Previous passive alignment approaches directly couple light between a fiber and an optoelectronic device without passing that light through a separate optical lens. As a result, divergence of the optical beam and differences in the optical-mode sizes can reduce the optical coupling efficiency. The assembly of the present invention contains a lens in addition to the optoelectronic device and the optical fiber. The lens insert contains all of the mechanical features that would be needed to control the input and output focal distances. Complicated lens profiles, such as aspheric or diffractive designs, can be accommodated by the approach of this invention.

The lenses of this invention are unlike the glass or polymer ball or rod lenses that have previously been used in active alignment schemes to couple light between a fiber and an optoelectronic device. The new lenses are fabricated onto silicon substrates. Silicon is transparent in the 1.3-1.6 micron wavelength region that is commonly used for optical fiber communication links. Further, silicon has a higher optical refractive index than that of the glasses or polymers. Because of silicon's specific and well defined etching characteristics, micron sized features for alignment and fixing can be formed in the lens substrate. These features are defined by means of photolithographic techniques that are practiced in the semiconductor integrated-circuit fabrication industry. Sub-micron accuracies are achieved with this patterning method. The alignment features are formed by wet-chemical etching and electroplating. Consequently, the fabrication approach undertaken for this invention does not require the expensive processing equipment and facilities associated with approaches based on dry-etching techniques such as reactive ion etching (RIE).

The present invention uses the base as a central alignment device to align all of the elements that are attached to the base. The optoelectronic device can only be cleaved to within a certain tolerance, currently plus or minus approximately one micron. As such, the overall accuracy of the alignment cannot decrease the tolerance beyond that numerical value. Further, the position of the core of the optical fiber also has a tolerance with respect to the physical center of the fiber. The present invention decreases the tolerances of the remaining alignments, e.g., core of optical fiber to the lens, lens to the base, optical fiber to the base, and lens to optoelectronic device, to reduce the overall alignment tolerance of the assembly.

The assemblies of the present invention can be used to manufacture optoelectronic modules such as laser-based transmitters, photodetector-based receivers, and optical modulators and switches. These modules, in turn, are used for various photonic networks and links. Applications include antenna remoting and photonic control of phased array antennas.

The present invention makes use of separately inserted optical elements which are not built into the silicon platform, and, thus, can be changed or interchanged in the system. All of the alignment features can be fabricated by using common processing equipment typically found in facilities that produce optoelectronic devices. The approaches of the related art either cannot include optical elements such as lenses, or must make the optical element as part of the silicon platform, thereby limiting the application of the final assembly.

Alignment Assembly

Figure 4:
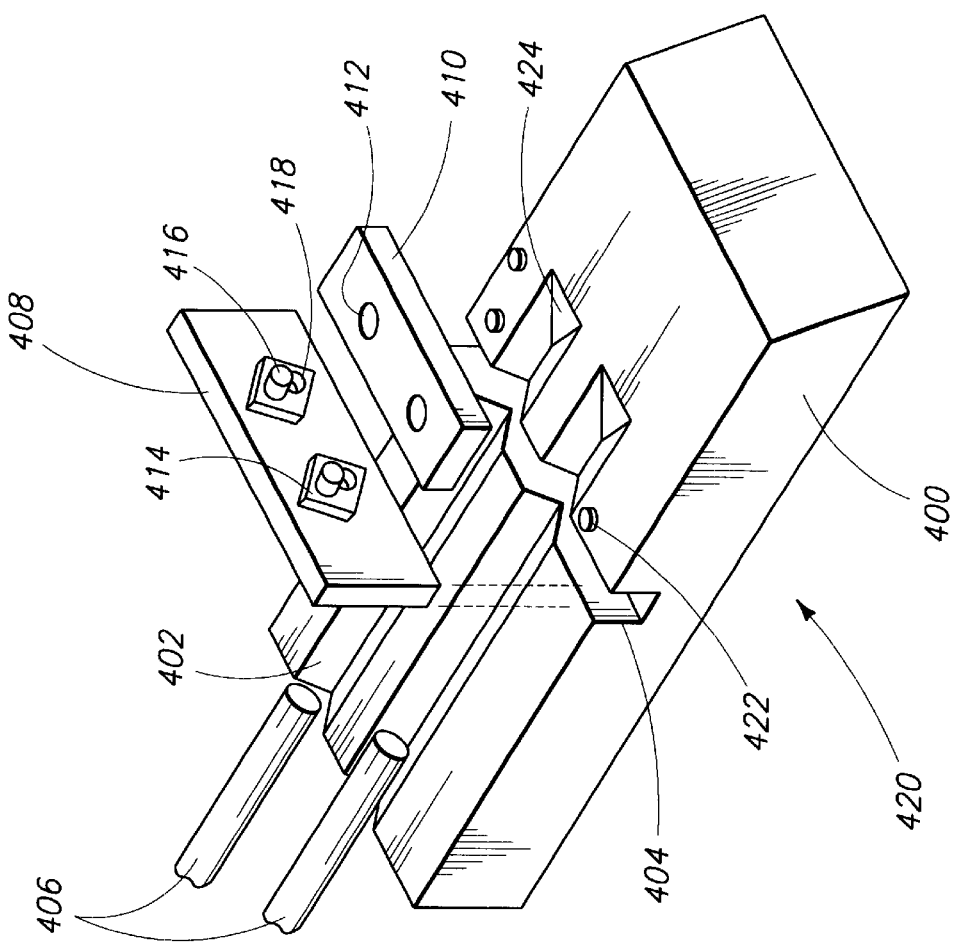
FIG. 4 illustrates an assembly utilizing the principles of the present invention.

FIG. 4 illustrates an assembly utilizing the principles of the present invention. Base 400 is fabricated from single crystal (100) silicon. Base 400 has a precision v-groove 402 and precision saw cut 404 that assist in the mechanical alignment of optical fibers 406 with lens insert 408 and photodetector chip 410. Photodetector chip 410 can contain multiple photodetectors 412 as desired. The v-shaped grooves 402 are formed by wet-chemical etching or other etching techniques.

Lens insert 408 is fabricated from single crystal (110) silicon. The lens insert 408 has an alignment mesa 414, which includes plated spacer 416 and an optical lens 418. By choosing (110) silicon for the lens insert 408 and (100) silicon for the base 400, the angle of the diamond-shaped mesas 414 will crystallographically match the angle of the v-grooves 402, providing an alignment match to within the tolerances of the crystal lattice. The use of (110) silicon in a substantially normal position to the (100) silicon used for the base thus provides an atomic-level alignment between lens insert 408 and base 400. As such, the alignment mesa 414 aligns on an atomic scale with the v-groove 402 of the base 400. The (100) crystallographic orientation of base 400 and the (110) crystallographic orientation of lens insert 408 are substantially perpendicular; as such, the perpendicular placement of lens insert 408 into groove 404 and the mesa 414 into v-groove 402 align the crystallographic orientations of the (100) and (110) silicon on an atomic scale. Although discussed with respect to (100) and (110) crystallographic orientations, other crystallographic orientations can be used to align lens insert 408 to base 400.

Further, although discussed with respect to a perpendicular alignment between lens insert 408 and base 400, other alignments can be performed by using other crystallographic orientations that provide different angles of alignment, e.g., using a different material for the base 400 and lens insert 408, such as gallium arsenide, that has a different lattice structure and different angles between the atoms in the crystalline lattice. Different lattice structures and different angles can be used for alignment of v-groove 402 and alignment mesa 414, as long as the crystalline structures substantially mate together as in the case of (100) and (110) silicon.

Furthermore, one material can be used for the base 400 and a second, different material can be used for the lens insert 408, e.g., gallium arsenide can be used for the base 400 and indium phosphide can be used for lens insert 408, silicon can be used for the base 400 and germanium can be used for lens insert 408, etc., so long as the crystalline structures substantially mate together between v-groove 402 and alignment mesa 414.

Different materials can also be used for lens insert 408 and base 400 as long as a common crystallographic plane can be found to align mesa 414 and v-groove 402. For example, silicon, a diamond structured material, can be used for base 400 and gallium arsenide, a zincblende structured material, can be used for lens insert 408, as long as matching crystallographic planes can be found to align mesa 414 and v-groove 402. Furthermore, although etchants may not reveal the proper plane within one or more of the materials being used, the materials used in the base 400, the lens insert 408, or both, can be grown using chemical vapor deposition (CVD), molecular beam epitaxy (MBE), masked growth, or other growth techniques, such that the proper crystallographic planes are exposed to align mesa 414 to v-groove 402.

Further, the v-groove 402 aligns the optical fiber 406 to the base 400. As such, the base 400 acts as a physical alignment structure for the lens insert 408 and the optical fiber 406, as well as the photodetector chip 410. The resultant assembly 420 now aligns all of the assembly 420 pieces, e.g., base 400, optical fiber 406, lens insert 408, and photodetector 410 together on an atomic scale to provide better alignment of the light in the optical fiber 406 to the photodetector 410 than assemblies of the related art.

Although an optoelectronic receiver with surface coupled photodetectors is illustrated, a similar approach can be used for transmitters. For example, photodetector chip 410 can be replaced with a transmitter to achieve atomic-scale alignment from the transmitter to the optical fiber 406. The transmitter can be a vertical-cavity surface emitting laser (VCSEL), or an edge-coupled device, such as lasers, photodetectors, modulators, and amplifiers, any of which can also be coupled to and aligned with optical fibers 406 and lens elements 418 using the approach of the present invention.

The optical lens insert 408 and alignment mesas 414 are formed by etching into the (110) silicon material. To provide additional flexibility in the assembly 420, stops 422 and mirrors 424 are used to align and configure the photodetector chip 410 onto base 400. The mirror 424 can either be uncoated or can be coated with a metal or other reflective film to improve the reflectivity of mirror 424 to reflect the light from optical fiber 406 out of the plane of base 400. The spacers 416 and stops 422 are formed by electroplating metal posts onto the silicon base 400 and lens insert 408. A lens insert 408 can have multiple sets, each set comprised of a lens element 418, front and/or back alignment mesas 414, and a spacer 416. Two sets are illustrated in FIG. 4. Each set can be associated with a separate optical fiber 406 and photodetector 412 and serves to couple the light from the fiber 406 to the photodetector 412. The silicon lens insert 408 can be mass produced on a wafer of (110) silicon and then diced into the individual microlenses 408 for ease of production.

The photodetector chip 410 is pressed against the stops 422 to fix the location of the photodetectors 412 with respect to the optical path. There are typically three stops 422 for each photodetector chip 410, but there can be a larger or smaller number of stops 422. The height of each stop 422 is preferably at least ten microns, to ensure that the photodetector chip 410 does not ride above the stops 422. Like the lens insert 408, the bases 400 can be mass-produced on (100) silicon and diced into individual bases 400.

Construction of assembly 420 receiver involves several steps in which parts are placed on the base 400 and then secured with adhesives. First, the photodetector chip 410 is placed, device side up, on the base 400 and pressed against the stops 422 and secured on the base 400. Next, the lens insert 408 is placed in the saw cut groove 404 with the lens 418 and spacer 416 side facing the photodetector chip 410.

The lens insert 408 piece is pushed towards the photodetector chip 410 so that the spacers 416 press against a side of the photodetector chip 410. Finally the optical fibers 406 are slid into the v-grooves 402 until the ends of the fibers 406 lightly press against the backside of the lens insert 408. The fibers 406 are also pressed into the v-grooves 402 and then secured.

Single-crystal silicon lenses, such as the lens insert 408 and optical lens 418, offers several advantages when compared with the common lens materials such as glass and polymers. The refractive index of silicon is approximately 3.5, which is substantially higher than the index (approximately 1.5) of typical glass and polymers. Because of the higher index, a lens 418 fabricated in silicon can have reduced spherical aberrations, and also less sag, for an equivalent focal length. Consequently, lenses 418 of smaller f# can be formed in silicon.

Design Table

One design for the silicon microlens is given in Table 1. This lens relays the output of a single-mode optical fiber onto the photodetector with unity magnification. The thickness of the silicon wafer is selected to substantially equal the back focal length of the lens, with the lens formed on the front surface of the wafer. The front focal distance sets the height of the spacer, which is pressed against the photodetector chip. Because of the large refractive index, a simple spherical lens can have almost negligible spherical aberration when compared to an ideal hyperbolic shape. An f/1.5 lens can be fabricated with a sag (the depth etched into the silicon) of only 3.4 microns. Various methods can be used to fabricate the lenses in silicon, including wet-etching, RIE, or other etch techniques.

Figure 5:
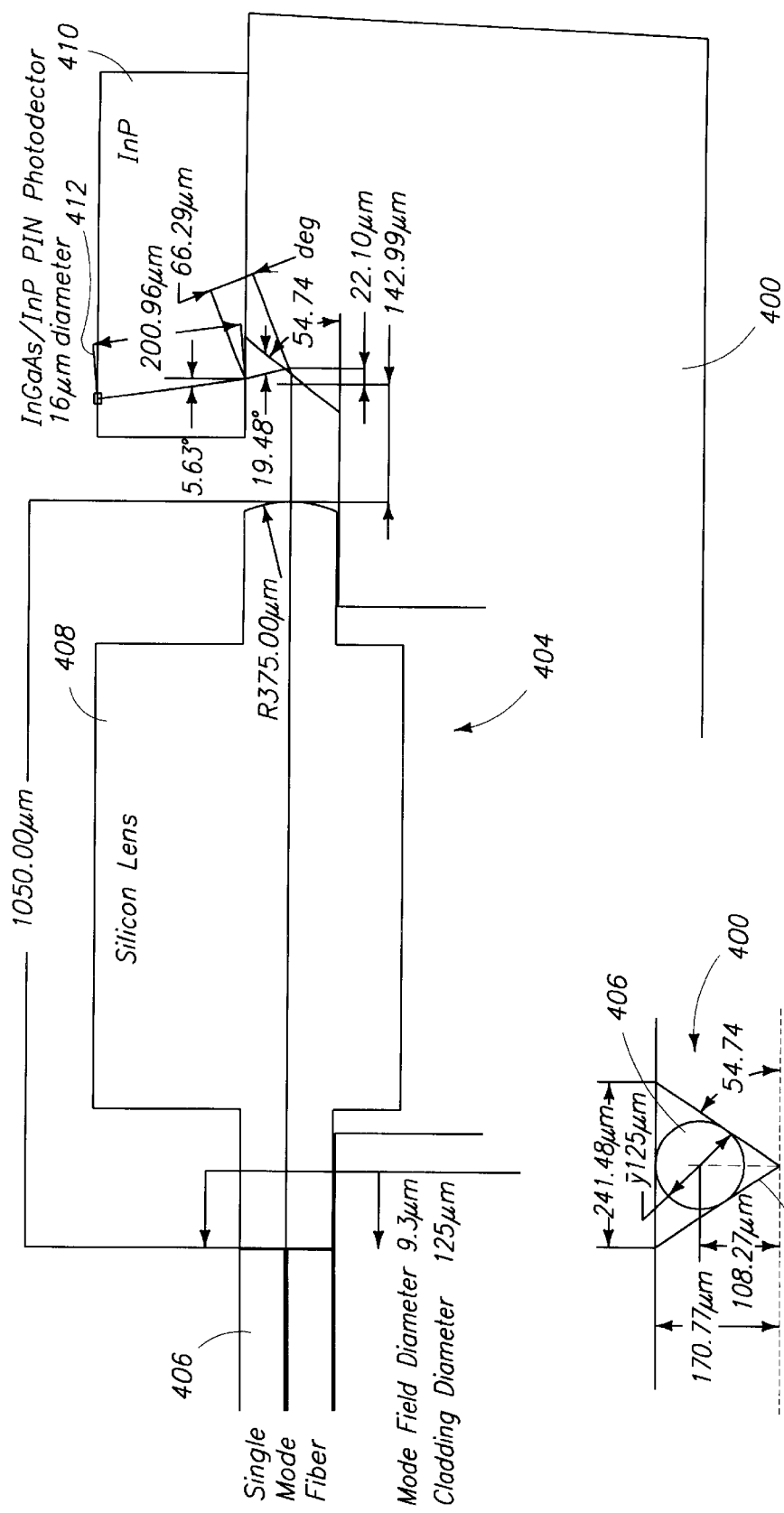
FIGS. 5 and 6 illustrate a side view of the assembly of the present invention.
Figure 6:
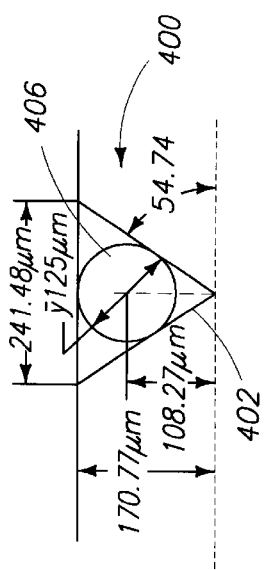

FIGS. 5 and 6 illustrate a side view of the assembly of the present invention. An exemplary design for the microfixtured assembly of the present invention is illustrated in FIGS. 5 and 6. The sidewalls and end of the v-groove 402 form surfaces that have an angle of 54.74 degrees relative to the plane of the base 400. As a consequence, the optical beam is at an angle of 19.48 degrees relative to the normal when it hits the back side of the photodetector chip 410. The incident angle at the photodetector chip 410 is reduced to 5.63 degrees because of the high refractive index of the photodetector chip 410, which is typically on an indium phosphide (InP) substrate. Proper alignment is obtained by controlling the distances of the photodetectors 412 from the front and side edges of the photodetector chip 410. A beneficial consequence of the inclined optical beam is that any light that is reflected from the photodetector chip 410 is directed away from the core of the optical fiber 406. Thus, the assembly has a high optical return loss (negligible light is coupled back into the optical fiber 406) to ensure good performance for analog optical links.

Process Chart

Figure 7:
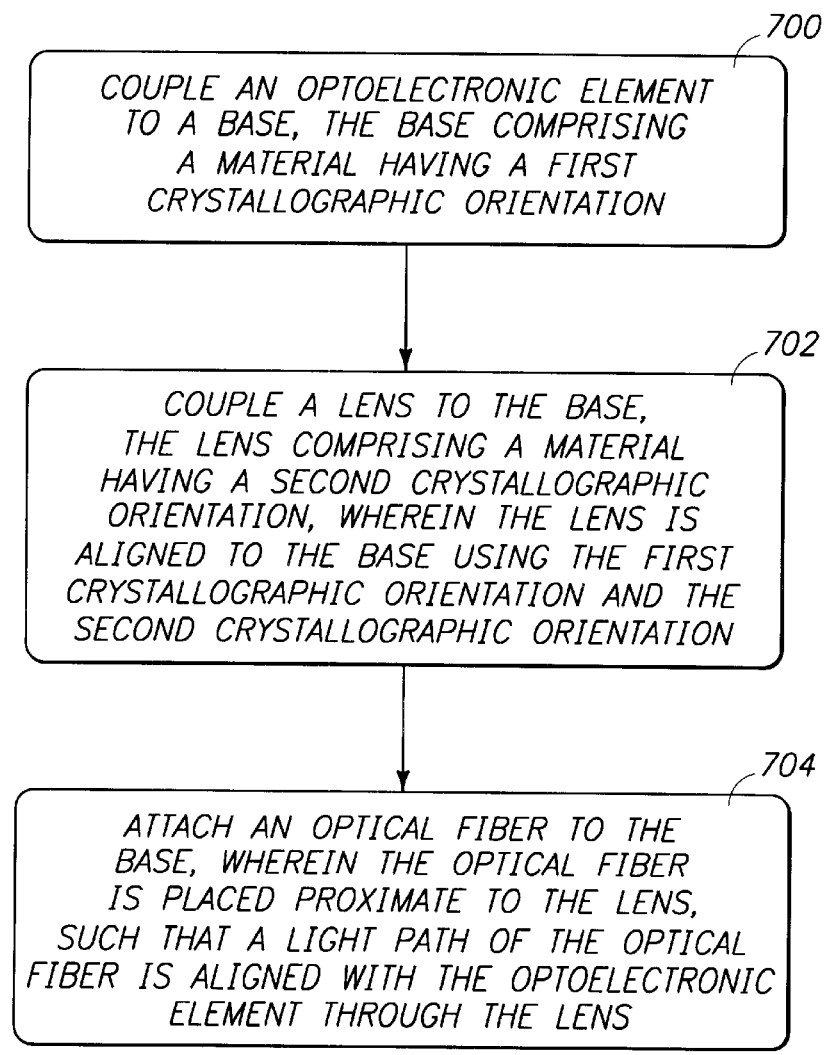
FIG. 7 is a flow chart illustrating the steps used in practicing one embodiment of the present invention.

FIG. 7 is a flowchart illustrating the steps used to practice one embodiment of the present invention.

Block 700 illustrates performing the step of coupling an optoelectronic element to a base, the base comprising a material having a first crystallographic orientation.

Block 702 illustrates performing the step of coupling a lens to the base, the lens comprising a material having a second crystallographic orientation, wherein the lens is aligned to the base using the first crystallographic orientation and the second crystallographic orientation.

Block 704 illustrates performing the step of attaching an optical fiber to the base, wherein the optical fiber is placed proximate to the lens, such that a light path of the optical fiber is aligned with the optoelectronic element through the lens.

The following paragraphs describe some alternative methods of accomplishing the same objects and some additional advantages for the present invention.

The techniques described in the present invention can be used to make optoelectronic transmitter and receiver assemblies, as well as optoelectronic data transmission systems economically feasible. Further, the present invention provides the ability to more completely utilize present optoelectronic systems because of the increased throughput of the system. increased throughput of the system.

In summary, the present invention provides a method and apparatus for aligning an optical fiber to an optoelectronic element. The apparatus comprises a base and a lens. The base is fabricated from a first crystallographic orientation, and includes an alignment feature for an optical fiber. The lens is fabricated from a second crystallographic orientation, and is aligned with the base using a second alignment feature associated with the first and second crystallographic orientations.

A method in accordance with the present invention comprises the steps of coupling an optoelectronic element to a base comprising a material having a first crystallographic orientation, coupling a lens to the base, the lens comprising a material having a second crystallographic orientation, wherein the lens is aligned to the base using the first crystallographic orientation and the second crystallographic orientation, and attaching an optical fiber to the base, wherein the optical fiber is placed proximate to the lens, such that a light path of the optical fiber is aligned with the optoelectronic element through the lens.

An optoelectronic assembly in accordance with the present invention comprises an optoelectronic element, a lens assembly, and a base. The optoelectronic element converts between an optical signal and an electrical signal. The lens assembly comprises a first material having a first crystallographic orientation and includes a first alignment feature. The base comprises a second material having a second crystallographic orientation and includes a second alignment feature. The lens assembly and base are aligned using the first alignment feature and the second alignment feature, the first alignment feature aligns the lens assembly to the optoelectronic element, and the second alignment feature aligns an optical fiber to the lens assembly.

The foregoing description of the preferred embodiment of the invention has been presented for the purposes of illustration and description and is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| | |
|---|---|
| MATERIAL | (110) Silicon |
| Substrate thickness | 1050 ± 10 μm |
| Substrate wedge | <3 arcmin |
| Wavelength | 1.55 μm |
| Refractive index | 3.48 |
| Microlens array | 1 × 4 |
| Focal length | 150 ± 7.5 μm (±5%) |
| Radius of curvature | 372 ± 18.6 μm (±5%) |

TABLE 1-continued

| | |
|---|---|
| Diameter | 100 μm (60 μm most critical) |
| Maximum sag | 3.38 ± 0.17 μm (±5%) |
| Center-center spacing | 500 ± 0.5 μm |
| Surface roughness | <100 A |

What is claimed is:

1. A method for aligning an optoelectronic element to an optical fiber, comprising the steps of:

coupling an optoelectronic element to a base, the base comprising a material having a first crystallographic orientation and having a first alignment feature for an optical fiber associated with the first crystallographic orientation;

coupling a lens to the base, the lens comprising a material having a second crystallographic orientation and having a second alignment feature associated with second crystallographic orientation, wherein the lens is aligned to the base by aligning the first alignment feature to the second alignment feature; and attaching the optical fiber to the base aligned with the first alignment feature, wherein the optical fiber is placed proximate to the lens, such that a light path of the optical fiber is aligned with the optoelectronic element through the lens;

wherein the first alignment feature aligns both the lens and the optical fiber.

2. The method of claim 1, wherein the first crystallographic orientation and the second crystallographic orientation are substantially normal.

3. The method of claim 1, wherein the optoelectronic element comprises one of a group comprising a modulator, a switch, a laser, a photodetector, a transmitter, and a receiver.

4. The method of claim 1, wherein the second alignment feature comprises an alignment mesa that aligns the lens to the base.

5. The method of claim 1, wherein the second alignment feature of the lens includes a plated spacer for aligning the optoelectronic element.

6. The method of claim 1, wherein the first alignment feature of the base comprises a groove.

7. An optoelectronic assembly, comprising:

an optoelectronic element for converting between an optical signal and an electrical signal;

a base comprising a first material having a first crystallographic orientation, the base including a first alignment feature associated with the first crystallographic orientation; and a lens assembly comprising a second material having a second crystallographic orientation, the lens assembly including a second alignment feature associated with the second crystallographic orientation;

wherein the base and the lens assembly are aligned using the first alignment feature and the second alignment feature, the second alignment feature aligns the lens assembly to the optoelectronic element and the first alignment feature aligns both the lens and the optical fiber.

8. The optoelectronic assembly of claim 7, further comprising the optical fiber for carrying the optical signal.

9. The optoelectronic assembly of claim 7, further comprising an optical connector for connecting the optical fiber to the optoelectronic assembly.

10. The optoelectronic assembly of claim 7, wherein the first crystallographic orientation and the second crystallographic orientation are substantially perpendicular.

11. The optoelectronic assembly of claim 7, wherein the optoelectronic element comprises one of a group comprises one of a group comprising a modulator, a switch, a laser, a photodetector, a transmitter, and a receiver.

12. The optoelectronic assembly of claim 7, wherein the second alignment feature of the lens assembly comprises an alignment mesa and the first alignment feature of the base comprises a groove, and the lens assembly is aligned to the base by aligning the alignment mesa into the groove.

13. The optoelectronic assembly of claim 7, wherein the second alignment feature includes a plated spacer for aligning the optoelectronic element.

14. The optoelectronic assembly of claim 7, wherein the base further includes a stop for aligning the optoelectronic element.

15. The method of claim 1, wherein the base further includes a stop for aligning the optoelectronic element.

* * * * *